(12) United States Patent
Sinn

(10) Patent No.: US 6,956,567 B2
(45) Date of Patent: Oct. 18, 2005

(54) DIFFERENTIAL VISUALIZATION OF COUNTOURED SURFACES

(75) Inventor: Christof Sinn, Nuremberg (DE)

(73) Assignee: Siemens Aktiengesellschaft, München (DE)

(*) Notice: Subject to any disclaimer, the term of this patent is extended or adjusted under 35 U.S.C. 154(b) by 318 days.

(21) Appl. No.: 10/243,619

(22) Filed: Sep. 13, 2002

(65) Prior Publication Data

US 2003/0052882 A1 Mar. 20, 2003

(30) Foreign Application Priority Data

Sep. 14, 2001 (DE) .......................................... 101 45 515

(51) Int. Cl.⁷ .............................................. G06T 15/00
(52) U.S. Cl. ..................................... 345/419; 382/266
(58) Field of Search ........................... 382/266; 345/440

(56) References Cited

U.S. PATENT DOCUMENTS 5,848,115 A * 12/1998 Little et al. ..................... 378/4

OTHER PUBLICATIONS

"An Algorithm for Deciding Similarities of Convex Polyhedra" Mukai, Furukawa, Obi, and Kjmura, Mar.–Apr. 1994, Computers & Graphics, vol. 18, No. 2, pp. 171–176.*

* cited by examiner

Primary Examiner—Jeffery Brier
Assistant Examiner—Jon Hadidi
(74) Attorney, Agent, or Firm—Henry M. Feiereisen

(57) ABSTRACT

A method and a system for visualizing differences of three-dimensional contour surfaces, in particular of three-dimensional contour surfaces produced by virtually machining a workpiece, are described. The method determines a first and second surface and spatial and/or volume differences between the contours of these surfaces. One of the surfaces together with the determined spatial and/or volume differences between the contours of the surfaces can be graphically rendered, wherein the differences are rendered as an additional attribute of the one surface, for example, in a different color.

27 Claims, 2 Drawing Sheets

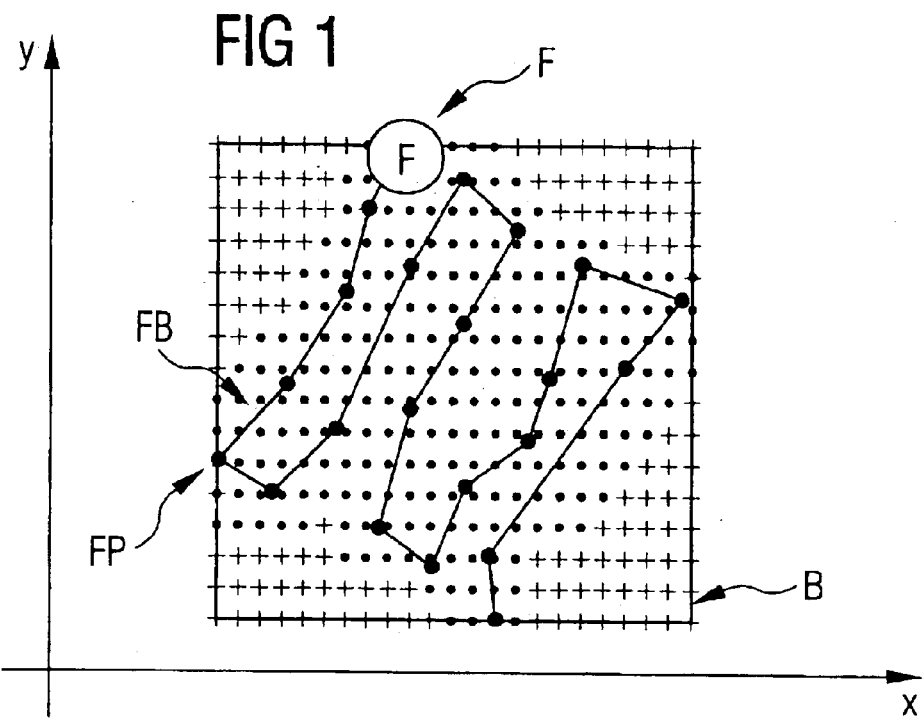
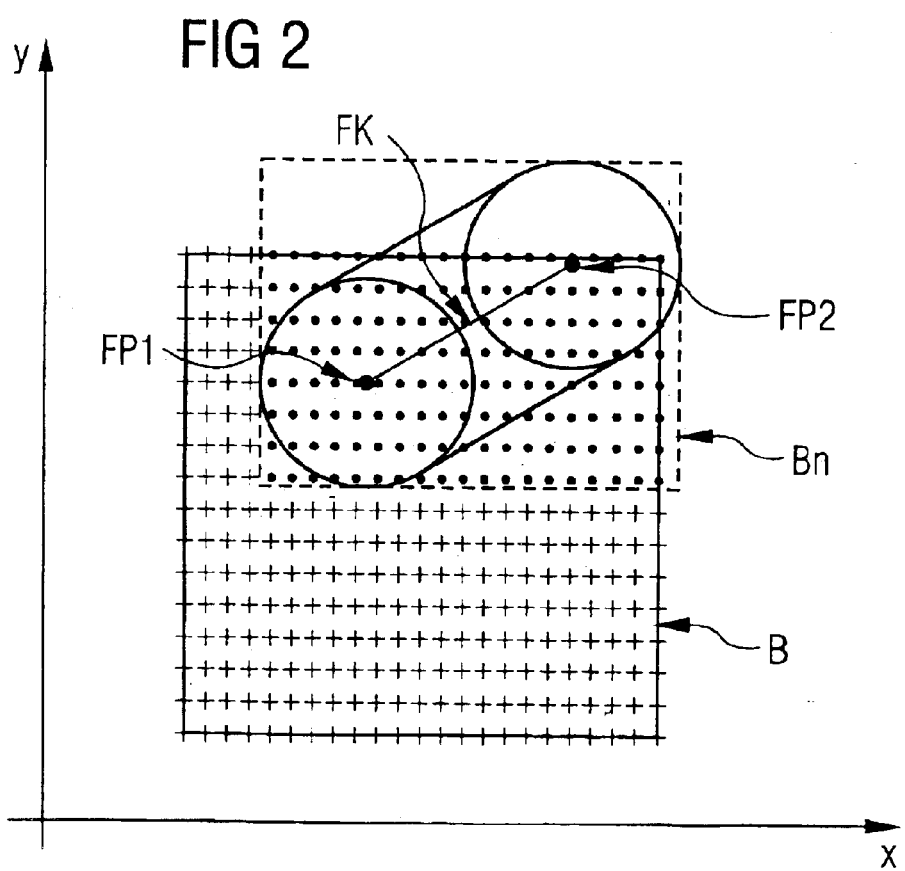

DIFFERENTIAL VISUALIZATION OF CONTOURED SURFACES

CROSS-REFERENCES TO RELATED APPLICATIONS

This application claims the priority of German Patent Application Serial No. 101 45 515.1, filed Sep. 14, 2001, pursuant to 35 U.S.C. 119(a)-(d), the subject matter of which is incorporated herein by reference.

BACKGROUND OF THE INVENTION

The present invention relates to a method for the visualization of differences between three-dimensional contoured surfaces, as well as to an apparatus for carrying out the method, in particular a simulation computer.

In CNC-controlled processing machines, a workpiece is typically either encoded directly or the workpiece is first modeled using a CAD system and thereafter converted into an equivalent CNC parts program. The resulting CNC parts programs and/or the CAD model then correspond to perfect processing commands for the processing machine. The CNC programs is then loaded into a CNC controller and the processing machine is controlled according to the CNC program.

If the workpiece manufactured according to this CNC program is within the desired manufacturing tolerances of an ideal workpiece, then this approach causes no problem. However, if the manufactured workpiece does not meet the desired requirements, then the process needs to be optimized and the necessary changes, for example in the CNC program, have to be made so that an acceptable workpiece can be produced.

It is possible to change sequentially individual processing commands and/or individual operating parameters of the processing machine, to produce a new workpiece and to then test the new workpiece. However, this approach is very time consuming and expensive, and wastes material. Moreover, the cause for deviations between the actually manufactured workpiece and the desired workpiece it is frequently not known.

For this reason, there is an increasing trend to simulate mechatronic systems, such as industrial processing machines. However, a visualization environment is needed for analyzing the simulation results and for realistically rendering the surface of a workpiece generated by the simulation.

Such a visualization environment is particularly important because visualization allows a better evaluation of the contours of several different workpieces calculated by the simulation system or of the differences between the actually produced workpiece and the desired workpiece.

Modern visualization elements provide three-dimensional rendering and can be integrated with other applications. The rendered content represents orthographic and/or perspective three-dimensional projections which can be interactively changed by the user. The user can typically rotate, displace and size (zoom) the rendered content. User-friendly visualization elements can also allow the user to obtain associated information by selecting certain details, such as for example the dimensions, spatial location or relationship to other details of the scene.

This leads to a better understanding of the manufacturing process. Moreover, the surface quality of the workpiece to be manufactured can be determined and analyzed already in the design stage, so that the existing parameter values of the control and drive of the machine tool can be optimized.

Accordingly, a "virtual workpiece" can be manufactured and/or the manufacturing operation can be carried out "virtually." It is hence not necessary to actually produce a workpiece. In principle, there is not even a need for a processing machine. The number of prototypes can be significantly reduced through simulation and virtual production which saves costs.

This applies when one and the same workpiece fabricated in two different ways (e.g. with differently parameterized power tools) is compared, or to one workpiece which is processed by different technologies, e.g. scrubbing, pre-sizing, sizing.

Conventional methods for visualizing several workpiece surfaces are limited to a graphically render the surfaces of different workpieces either individually or side-by-side.

Accordingly, it would be desirable and advantageous to provide a visualization of differences between two three-dimensional contoured surfaces, so that a user can clearly and effectively display even small differences between the surfaces and evaluate surface qualities and differences between such surface qualities.

SUMMARY OF THE INVENTION

According to one aspect of the invention, in a method for differential visualization of two three-dimensional contoured surfaces, in particular of workpieces, a first and second surface are determined, spatial differences between contours of the determined first and second surfaces is determined, and one of the surfaces together with the determined spatial differences between the contours of the determined first and second surfaces are graphically rendered, wherein the determined spatial differences form an additional attribute of the one surface.

Further embodiments of the invention may include one or more of the following features.

When the one surface is graphically rendered, the determined spatial differences can be projected onto the one surface as interpolated values, for example, in color, wherein the projected color values can be in a different color from the surface onto which the interpolated values are projected. The spatial differences between the contours can also be modeled as volume values, and applied to the one surface before the surface is graphically rendered. The volume values can be rendered transparent or in color with interpolated colors. This can be achieved, for example, by defining the contours of the first and second surfaces analytically, e.g., by mathematical functions in three-dimensional space, and determining the spatial differences continuously based on values derived from the analytically defined contours.

The computational complexity can be reduced by determining from workpiece data a plurality of discrete support points in three-dimensional space, and by determining for each surface a grid surface based on the discrete support points. The spatial difference between the grid surfaces of the first and second surface can then be obtained by forming a difference between corresponding support points located on the first and second grid surfaces.

The grid surfaces can be conveniently produced by defining a family of straight lines extending parallel to a first coordinate axis in three-dimensional space and modeling a blank workpiece using the family of straight lines. The family of straight lines can then be intersected with a virtual machining tool according to a predetermined machining path to form scanned volumes, whereby a grid surface corresponding to a workpiece contour is then formed from the resulting points of intersection of all scanned volumes.

For simulating machining in three coordinate axes, only the points of intersection that have the smallest coordinate value in the direction of the straight line may be considered for forming the grid surface. If a straight line does not intersect with the virtual machining tool, an initialization value is used instead for forming the grid surface.

The computation can be more efficient if the straight lines are arranged with a discrete equidistant spacing along those coordinate axes (x, y) that are different from the first coordinate axis, typically referred to as z-axis. The aforedescribed method can advantageously be used to evaluate of surface qualities of workpieces in a virtual manufacturing operation, in particular in the course of virtual manufacturing of a workpiece according to different machining instructions.

According to another aspect of the invention, a device is provided for implementing the method for differential visualization of two three-dimensional contoured surfaces, in particular of workpieces. The device can be a digital simulation computer, which includes application software for determining a first and second surface and the spatial differences between contours of these surfaces. The device also includes application software for graphically rendering one of the surfaces together with the determined spatial differences between the contours of the determined first and second surfaces, wherein the determined spatial differences form an additional attribute of the one surface.

According to yet another aspect of the invention, a computer program product adapted to execute on a digital computer, for differential visualization of two three-dimensional contoured surfaces, in particular of workpieces, includes computer program instructions for carrying out the aforedescribed method steps.

Advantageously, the first grid and the second grid can be triangular grids, with the second grid surface corresponding to one of the NC program data, a control output and an actual position value. The grid surface consisting of triangles can be computed from the computed contour points. The grid is subsequently supplied to a visualization component, for example a computer with a corresponding graphics display. One approach for generating a grid surface from contour points is described, for example, by Maier, K. -H.: "Network algorithm based on 3-D data points distributed uniformly in a meander pattern", Technical Report, Siemens A G, Nürnberg, 2001.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a two-dimensional top view of an exemplary milling path with a grid surface for representing a workpiece surface;

FIG. 2 is an optimized grid surface based on FIG. 1 for machining with a spherical cutter.

DETAILED DESCRIPTION OF PREFERRED EMBODIMENTS

Figure 3:
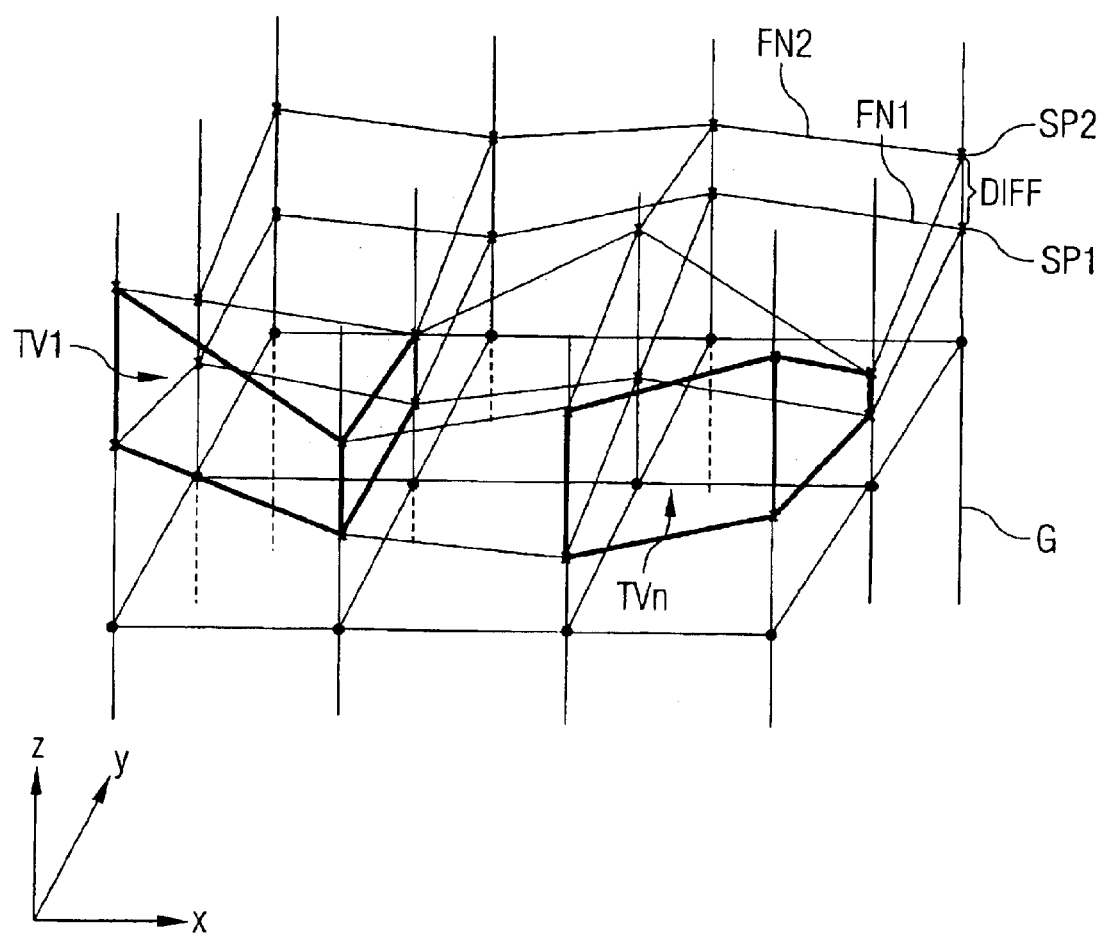
FIG. 3 shows two grid surfaces and a family of straight lines representing a difference volume.

Throughout all the Figures, identical or corresponding elements are generally indicated by same reference numerals.

The invention is directed to a method for determining a grid surface for a workpiece processed with a virtual milling process with three axes, and to a differential visualization on the basis of two such grid surfaces.

The grid surface can be determined, for example, based on uniformly spaced straight lines that extend in the x-and y-direction and are parallel to the vertical z-axis. Preferably, the allowed straight lines must have point-shaped orthogonal projections in the xy-plane that are located inside a rectangle having mutually parallel axes (the definition of the rectangle will be discussed in more detail below). The family of straight lines models a blank workpiece which is represented by discrete data points in the x-and y-direction and extends to infinity along the positive and negative z-direction.

FIG. 1 shows schematically in a two-dimensional representation a top view along the z-axis of a uniformly distributed family of straight lines with a surrounding rectangle B for an exemplary milling path. The observer looks essentially along the z-direction. This straight lines are indicated by circles or crosses. A large circle indicates a spherical cutter F.

Milling points FP are indicated by circles that are greater than those of the straight lines and smaller than those of the cutter F. A resulting milling path FB forms a linearly interpolated polygon in three-dimensional space. It should be mentioned that there is no requirement that the rectangle defining the family of straight lines and the milling points have any special spatial relationship. However, the rectangle B is typically determined by taking into account the milling data.

In an actual milling operation, the cutter F moves according to the programmed path of the center of the cutter (cutter path FB). The cutter hereby removes material from the blank workpiece. The workpiece to be manufactured remains as residual material at the end of the machining process. The disclosed method of the invention imitates this process. The virtual cutter F also moves along the defined cutter path FB and cuts the blank workpiece which is modeled, as described above, by a family of straight lines. That traversed volume can be modeled by two spheres and a cylinder oriented in the milling direction—similar in shape to a pill.

FIG. 2 which is similar to FIG. 1 depicts the traversed volume in more detail. Only the region along the milled edge FK is of interest in the illustration. FP1 denotes the starting point and FP2 the end point of a milling path. The milling edge is the line connecting FP1 and FP2. The volume removed by the cutter F at the starting point FP1 is indicated by a circle, as is the volume at the end point FP2. The volume traversed along the line from FP1 to FP2 is indicated by two lines tangential to the circumference of both circles around FP1 and FP2. When looking at the total surface area formed by these geometries in three-dimensional space, the enclosed volume has again the form of a pill which is formed of two spheres and a cylinder extending in the milling direction.

The lines of the family intersect the volume (pill) traversed by the cutter F along a milled edge FK either not at all, once or twice. When milling along three axes, the workpiece contour is modeled in discrete intervals by the lower points of intersection between all traversed volumes (pills) and all straight lines and the initializing points of all straight lines that do not intersect the traversed volumes. The volumes that are traversed by the cutter F relative to an edge intersect the straight lines. In FIG. 1 depicts traversed straight lines with intersecting points as points, and straight lines without intersecting points as crosses.

The points of intersection are suitable for reproducing the workpiece contour. When machining along three axes, the points of intersection are part of the final workpiece contour, if there are no additional points of intersection with a smaller z-coordinate.

Based on the determined contour points, a grid surface, e.g., a triangular grid, is formed, which describes the surface of the workpiece and can be rendered on a graphics display. It will be assumed in the following that two such grid surfaces are present, describing two different workpiece surfaces, for example, the resulting surfaces of a first simulation of machining a workpiece with a first NC machining program or a further simulation with a slightly changed NC machining program, or a first surface based on parts program data and the same surface based on an output from a corresponding fine interpolator. The differences between both grid surfaces are visualized according to the invention in order to evaluate the resultant surface quality of the workpiece before the workpiece is actually machined.

Assuming that there is a difference between the two workpiece contours, a volume difference between the contour points of a first and a second grid surface can be computed, for example, by forming for each straight line G of the family of straight lines the difference DIFF of the points of intersection SP1, SP2 with each of the grid surfaces FN1, FN2.

FIG. 3 illustrates this relationship with reference to a grid structure in three-dimensional space x, y, z. The straight lines G of the family of straight lines intersect the two grid surfaces FN1, FN2 at corresponding points of intersection SP, of which exemplary points of intersection and/or contour points SP1, SP2 are indicated. The distance between these two points represents a discrete difference value DIFF along the z-direction. In the same way, a corresponding difference can be computed for the other lines of the family and used to graphically render a difference volume.

A difference volume can be easily determined by connecting the associated points of intersection between the first grid surface FN1 and four adjacent lines of the family which form the corners of a rectangle (in special situations a square). The same is done for the second grid surface FN2. Thereafter, the volume enclosed between the two planes is determined (see, for example, the exemplary partial volumes TV1, . . . , TVn depicted in FIG. 3). This is done until all the lines of the family have been accounted for. Alternatively, three adjacent lines of the family forming a triangle or other geometric forms can be used with similar results. Using four points makes determining the difference volume particularly simple.

The differences are determined for the general case with two contour surfaces by moving from an arbitrary point on one surface perpendicular/vertical upwardly or downwardly until intersecting the second surface. The obtained distance is the desired difference value DIFF.

The determined spatial difference of the contours can now be visualized together with the contour points of one of the two grid surfaces, for example, by graphically rendering the grid surface on a display in a first color and by interpolating and rendering the determined volume difference values in another color as projections on the surface of the workpiece that is described by the grid surface. Those areas showing a deviation can then be localized directly on the surface.

The colors can be interpolated by first determining the extreme difference values (minimum, maximum), which are then associated with the colors blue (minimum) and red (maximum). The colors for other difference values can then be linearly interpolated on the blue/red scale. Chromatic and achromatic color ranges between blue and red can be selected.

The volume difference values are projected on the surface by visualizing and simultaneously coloring a set of points (for example the points of intersection of the family of straight lines) with the previously determined color values. In addition, the colors of the grid surface (with or without fill) can be interpolated according to the projected color values.

The projection can be performed with a 3-D graphics library, whereby different colors can be associated with the visualized points through the material binding "PER_VERTEX".

Alternatively, the determined contour difference (discrete difference values) itself can also be modeled as a volume and applied to the surface described by the grid surface, for example, by interpolating the (volume-) colors of the difference volume. Alternatively, the difference volume can also be rendered transparent.

The difference volume can be visualized using eight points of intersection with the vertical auxiliary straight lines (family of straight lines) which form a discrete representation of the blank workpiece. These points of intersection can be connected to form a body, whereby each of the lateral surfaces is parallel to a coordinate plane.

The body can be rendered either transparent, for example by modeling the body using a special grid class of a 3-D graphics library and assigning a transparency index. The body can be rendered in color by coloring the volume according to the point of the body having the maximum distance, or by taking into consideration all corner points of the body. The color of the volume body is then interpolated and changes inside the volume.

In another approach for visualizing the differences between grids by coloring, positive differences (grid FN2 is located above grid FN1) can be colored for example blue, and negative differences (grid FN2 is located below grid FN1) can be colored for example red. This allows a quick determination if too much material has already been milled off during sizing (pointing, for example, to an error in the sizing program).

The graphic visualization according to the invention lets a user much more easily evaluate the surface quality as compared to a situation where the contours are presented in separate workspaces, for example, different windows on a computer display. By forming differences and graphically rendering these differences, the two virtually produced workpiece contours can be associated directly within a view on the screen.

While the invention has been illustrated and described in connection with preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for differential visualization of two three-dimensional contoured surfaces, in particular of workpieces, comprising the steps of:

determining a first and second surface;

determining spatial differences between contours of the determined first and second surfaces; and graphically rendering one of the surfaces together with the determined spatial differences between the contours of the determined first and second surfaces, said determined spatial differences forming an additional attribute of the one surface, wherein graphically rendering the one surface includes protecting the determined spatial differences onto the one surface as interpolated values.

2. The method of claim 1, wherein the projected spatial differences are projected in a color, and wherein the projected color is different from a color of the one surface.

3. A method for differential visualization of two three-dimensional contoured surfaces, in particular of workpieces, comprising the steps of:

determining a first and second surface;

determining spatial differences between contours of the determined first and second surfaces;

graphically rendering one of the surfaces together with the determined spatial differences between the contours of the determined first and second surfaces, said determined spatial differences forming an additional attribute of the one surface; and modeling the spatial differences between the contours as volume values that are rendered as interpolated colors, and applying the volume values to the one surface before the one surface is graphically rendered.

4. A method for differential visualization of two three-dimensional contoured surfaces, in particular of workpieces, comprising the steps of:

determining a first and second surface;

determining spatial differences between contours of the determined first and second surfaces; and graphically rendering one of the surfaces together with the determined spatial differences between the contours of the determined first and second surfaces, said determined spatial differences forming an additional attribute of the one surface, wherein the contours of the first and second surfaces are defined analytically and the spatial differences are determined continuously based on values derived from the analytically defined contours of the first and second surfaces.

5. A method for differential visualization of two three-dimensional contoured surfaces, in particular of workpieces, comprising the steps of:

determining a first and second surface;

determining spatial differences between contours of the determined first and second surfaces;

graphically rendering one of the surfaces together with the determined spatial differences between the contours of the determined first and second surfaces, said determined spatial differences forming an additional attribute of the one surface;

determining from workpiece data a plurality of discrete support points in three-dimensional space, and determining for each surface a grid surface based on the discrete support points, wherein the spatial difference between the grid surfaces of the first and second surface is obtained by forming a difference between corresponding support points located on the first and second grid surfaces.

6. The method of claim 5, and further comprising the steps of defining a family of straight lines extending parallel to a first coordinate axis in three-dimensional space; modeling the workpiece with a blank workpiece using the family of straight lines; intersecting the family of straight lines with a virtual machining tool according to a predetermined machining path to form scanned volumes; and forming from the resulting points of intersection of all scanned volumes a grid surface corresponding to a workpiece contour.

7. The method of claim 6, wherein when simulating machining in three coordinate axes, only those points of intersection with a straight line are considered for forming the grid surface that have the smallest coordinate value in the direction of the straight line.

8. The method of claim 6, wherein for a straight line without a point of intersection with the virtual machining tool, an initialization value is used for forming the grid surface.

9. The method of claim 6, and further comprising the step of arranging the straight lines of the family of straight lines with a discrete equidistant spacing along those coordinate axes that are different from the first coordinate axis.

10. A device for differential visualization of two three-dimensional contoured surfaces, in particular of workpieces, comprising:

means for determining a first and second surface;

means for determining spatial differences between contours of the determined first and second surfaces; and means for graphically rendering one of the surfaces together with the determined spatial differences between the contours of the determined first and second surfaces, said determined spatial differences forming an additional attribute of the one surface, wherein graphically rendering the one surface includes protecting the determined spatial differences onto the one surface as interpolated values.

11. Computer program product adapted to execute on a digital computer, for differential visualization of two three-dimensional contoured surfaces, in particular of workpieces, the computer program product comprising:

computer program instructions for determining a first and a second surface;

computer program instructions for determining spatial difference values between contours of the determined first and second surfaces; and computer program instructions for graphically rendering one of the surfaces together with the determined spatial difference values between the contours of the determined first and second surfaces, said determined spatial difference values forming an additional attribute of the one surface, wherein graphically rendering the one surface includes protecting the determined spatial differences onto the one surface as interpolated values.

12. The method of claim 10, wherein the projected spatial differences are projected in a color, and wherein the projected color is different from a color of the one surface.

13. A device for differential visualization of two three-dimensional contoured surfaces, in particular of workpieces, comprising:

means for determining a first and second surface;

means for determining spatial differences between contours of the determined first and second surfaces;

means for graphically rendering one of the surfaces together with the determined spatial differences between the contours of the determined first and second surfaces, said determined spatial differences forming an additional attribute of the one surface;

means for modeling the spatial differences between the contours as volume values that are rendered as interpolated colors, and means for applying the volume values to the one surface before the one surface is graphically rendered.

14. A device for differential visualization of two three-dimensional contoured surfaces, in particular of workpieces, comprising:

means for determining a first and second surface;

means for determining spatial differences between contours of the determined first and second surfaces; and means for graphically rendering one of the surfaces together with the determined spatial differences between the contours of the determined first and second surfaces, said determined spatial differences forming an additional attribute of the one surface, wherein the contours of the first and second surfaces are defined analytically and the spatial differences are determined continuously based on values derived from the analytically defined contours of the first and second surfaces.

15. A device for differential visualization of two three-dimensional contoured surfaces, in particular of workpieces, comprising:

means for determining a first and second surface;

means for determining spatial differences between contours of the determined first and second surfaces; and means for graphically rendering one of the surfaces together with the determined spatial differences between the contours of the determined first and second surfaces, said determined spatial differences forming an additional attribute of the one surface, wherein a plurality of discrete support points is determined from workpiece data in three-dimensional space, wherein for each surface a grid surface is determined based on the discrete support points, and wherein the spatial difference between the grid surfaces of the first and second surface is obtained by forming a difference between corresponding support points located on the first and second grid surfaces.

16. The device of claim 15, wherein a family of straight lines extending parallel to a first coordinate axis is defined in three-dimensional space, wherein the workpiece is modeled with a blank workpiece using the family of straight lines, with the family of straight lines intersecting with a virtual machining tool according to a predetermined machining path to form scanned volumes, and wherein from the resulting points of intersection of all scanned volumes a grid surface is formed that corresponds to a workpiece contour.

17. The device of claim 16, wherein when simulating machining in three coordinate axes, only those points of intersection with a straight line are considered for forming the grid surface that have the smallest coordinate value in the direction of the straight line.

18. The device of claim 16, wherein for a straight line without a point of intersection with the virtual machining tool, an initialization value is used for forming the grid surface.

19. The device of claim 16, wherein the straight lines of the family of straight lines are arranged with a discrete equidistant spacing along those coordinate axes that are different from the first coordinate axis.

20. The computer program product of claim 11, wherein the projected spatial differences are projected in a color, and wherein the projected color is different from a color of the one surface.

21. Computer program product adapted to execute on a digital computer, for differential visualization of two three-dimensional contoured surfaces, in particular of workpieces, the computer program product comprising:

computer program instructions for determining a first and a second surface;

computer program instructions for determining spatial difference values between contours of the determined first and second surfaces; and computer program instructions for graphically rendering one of the surfaces together with the determined spatial difference values between the contours of the determined first and second surfaces, said determined spatial difference values forming an additional attribute of the one surface, computer program instructions for modeling the spatial differences between the contours as volume values that are rendered as interpolated colors, and computer program instructions for applying the volume values to the one surface before the one surface is graphically rendered.

22. Computer program product adapted to execute on a digital computer, for differential visualization of two three-dimensional contoured surfaces, in particular of workpieces, the computer program product comprising:

computer program instructions for determining a first and a second surface;

computer program instructions for determining spatial difference values between contours of the determined first and second surfaces; and computer program instructions for graphically rendering one of the surfaces together with the determined spatial difference values between the contours of the determined first and second surfaces, said determined spatial difference values forming an additional attribute of the one surface, wherein the contours of the first and second surfaces are defined analytically and the spatial differences are determined continuously based on values derived from the analytically defined contours of the first and second surfaces.

23. Computer program product adapted to execute on a digital computer, for differential visualization of two three-dimensional contoured surfaces, in particular of workpieces, the computer program product comprising:

computer program instructions for determining a first and a second surface;

computer program instructions for determining spatial difference values between contours of the determined first and second surfaces; and computer program instructions for graphically rendering one of the surfaces together with the determined spatial difference values between the contours of the determined first and second surfaces, said determined spatial difference values forming an additional attribute of the one surface, computer program instructions for determining from workpiece data a plurality of discrete support points in three-dimensional space, and computer program instructions for determining for each surface a grid surface based on the discrete support points, wherein the spatial difference between the grid surfaces of the first and second surface is obtained by forming a difference between corresponding support points located on the first and second grid surfaces.

24. The computer program product of claim 23, and further comprising computer program instructions for defining a family of straight lines extending parallel to a first coordinate axis in three-dimensional space;

modeling the workpiece with a blank workpiece using the family of straight lines; intersecting the family of straight lines with a virtual machining tool according to a predetermined machining path to form scanned volumes; and forming from the resulting points of intersection of all scanned volumes a grid surface corresponding to a workpiece contour.

25. The computer program product of claim 24, wherein when simulating machining in three coordinate axes, only those points of intersection with a straight line are considered for forming the grid surface that have the smallest coordinate value in the direction of the straight line.

26. The computer program product of claim 24, wherein for a straight line without a point of intersection with the virtual machining tool, an initialization value is used for forming the grid surface.

27. The computer program product of claim 24, and further comprising computer program instructions for arranging the straight lines of the family of straight lines with a discrete equidistant spacing along those coordinate axes that are different from the first coordinate axis.

* * * * *